United States Patent
Johnson et al.

(10) Patent No.: US 11,293,751 B2
(45) Date of Patent: Apr. 5, 2022

(54) PROFILE INSPECTION SYSTEM FOR VERIFYING RELATIVE POSITION OF VEHICLE COMPONENT OBJECTS AND MANUFACTURING CELL INCLUDING SAME

(71) Applicant: Honda Motor Co., Ltd., Tokyo (JP)

(72) Inventors: Donovan Johnson, Harvest, AL (US); David A. Nichols, Weaver, AL (US); Jason D. Hendon, Ashland, AL (US); Jasmeen Luckey, Hattiesburg, MS (US)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/580,540

(22) Filed: Sep. 24, 2019

(65) Prior Publication Data
US 2021/0089733 A1    Mar. 25, 2021

(51) Int. Cl.
*G01B 11/24* (2006.01)
*G06K 7/10* (2006.01)
*G01C 7/00* (2006.01)
*G01B 11/00* (2006.01)
*G01B 11/08* (2006.01)

(52) U.S. Cl.
CPC ............. *G01B 11/24* (2013.01); *G01B 11/00* (2013.01); *G01C 7/00* (2013.01); *G06K 7/10792* (2013.01); *G01B 11/08* (2013.01)

(58) Field of Classification Search
CPC ........... G06K 7/10613; G06K 7/10792; G01B 11/24; G01B 11/00; G01B 11/08; G01B 5/0004; G01C 7/00
See application file for complete search history.

(56) References Cited

U.S. PATENT DOCUMENTS

| 4,598,481 A | 7/1986 | Donahue |
| 5,812,269 A * | 9/1998 | Svetkoff ................ G01B 11/24 250/559.23 |

(Continued)

FOREIGN PATENT DOCUMENTS

| CN | 102632458 A | 8/2012 |
| CN | 104858748 A | 8/2015 |

(Continued)

*Primary Examiner* — Michael P LaPage
(74) *Attorney, Agent, or Firm* — Kenealy Vaidya LLP

(57) ABSTRACT

A manufacturing cell for manufacturing a vehicle component can include an intelligent actuator, a pneumatic rotational cylinder, an arm, a laser scanner, and a controller. The arm can extend downward from the intelligent actuator to the pneumatic rotational cylinder. The laser scanner can be attached to the pneumatic rotational cylinder for movement with the pneumatic rotational cylinder. The laser scanner configured to scan at least a first object and a second object, and create profile data indicative of a 3D profile of the first object and the second object. The controller can be configured to assure that the second object is in a positive condition by using the profile data to determine the positive condition for the second object if the tolerance distance lies within a set range, and determine a flagged condition for the second object if the tolerance distance lies outside the set range.

20 Claims, 7 Drawing Sheets

(56) References Cited

U.S. PATENT DOCUMENTS

| | | | |
|---|---|---|---|
| 6,501,554 B1* | 12/2002 | Hackney | G01B 11/00 |
| | | | 356/601 |
| 6,554,189 B1* | 4/2003 | Good | G02B 26/106 |
| | | | 235/462.01 |
| 7,912,673 B2 | 3/2011 | Hébert et al. | |
| 9,599,537 B2 | 3/2017 | DeAscanis et al. | |
| 9,791,381 B2 | 10/2017 | Lim et al. | |
| 2017/0182605 A1* | 6/2017 | Rajagopalan | B23K 9/0282 |
| 2020/0198939 A1* | 6/2020 | Kosaka | H04N 7/18 |

FOREIGN PATENT DOCUMENTS

| | | |
|---|---|---|
| CN | 105598450 A | 5/2016 |
| TW | 201441376 A | 11/2014 |

* cited by examiner

PROFILE INSPECTION SYSTEM FOR VERIFYING RELATIVE POSITION OF VEHICLE COMPONENT OBJECTS AND MANUFACTURING CELL INCLUDING SAME

BACKGROUND

The disclosed subject matter relates to inspecting an article of manufacture. More particularly, the disclosed subject matter relates to methods and apparatus for using a scanned profile image of a vehicle component to inspect the vehicle component and/or vehicle assembly.

Scanning systems can be used to inspect an article of manufacture to determine whether the position, shape and/or size of the article of manufacture is within a desired specification. For example, the scanning system can be configured to create a profile image a portion of or all of the article of manufacture. The profile image can represent the relative position(s) of one or more feature(s) of the article of manufacture. For example, the profile image can represent a relative location and orientation of a timing belt guide plate mounted onto an internal combustion engine, or the location of points on the surface of a vehicle brake disc, or a gap between two vehicle panels, or the diameter and location of a machined hole in an engine cylinder block or in a steering assembly, or the depth of a tire tread, etc. The profile image can be compared to a predetermined image, data set and/or threshold value(s). This comparison can be used to determine whether the article of manufacture (e.g., a vehicle component and/or vehicle assembly) conforms to the desired specification (e.g., correct size and/or location). The optical scanning device can be held stationary while the article of manufacture that is being inspected moves in a linear or rotational manner with respect to the optical scanning device.

SUMMARY

Some embodiments are directed to a manufacturing cell for manufacturing a vehicle component. The manufacturing cell can include an intelligent actuator, a pneumatic rotational cylinder, an arm, a laser scanner, and a controller. The arm can extend downward from the intelligent actuator to the pneumatic rotational cylinder. The laser scanner can be attached to the pneumatic rotational cylinder for movement with the pneumatic rotational cylinder. The laser scanner configured to scan at least a first object and a second object, and create profile data indicative of a 3D profile of the first object and the second object. The controller can be in electrical communication with the laser scanner and configured to assure that the second object is in a positive condition by storing the profile data, using the stored profile data to calculate a tolerance distance from a maximum height of the first object to a maximum height of the second object, and determine the positive condition for the second object if the tolerance distance lies within a set range, and determine a flagged condition for the second object if the tolerance distance lies outside the set range.

Some embodiments are directed to a method for inspecting a first vehicle assembly and a second vehicle assembly comprising: holding each of the first vehicle assembly and the second vehicle assembly in a respective stationary scanning position, the first vehicle assembly includes a first object and a second object, and the second vehicle assembly includes another first object and another second object; scanning each of the first objects and each of the second objects by moving and rotating a laser scanner relative to the stationary scanning positions; creating profile data indicative of a 3D profile of each pair of the first object and the second object; storing the profile data; using the stored profile data to calculate a tolerance distance from a maximum height of each the first objects to a maximum height of each of a respective one of the second objects; determining a positive condition for a respective one of the second objects if the tolerance distance lies within a set range, and determining a flagged condition for a respective one of the second objects if the tolerance distance lies outside the set range.

Some embodiments are directed to A profile inspection system for verifying a relative position between a first vehicle component object and a second vehicle component object. The inspection station can include a linear actuator, a support arm connected to the linear actuator, a rotary actuator connected to the support arm, a laser scanner connected to the rotary actuator, and a controller in electrical communication with the laser scanner. The laser scanner can be configured to scan at least the first vehicle component object and the second vehicle component object, and create profile data of the first vehicle component object and the second vehicle component object based on the scan. The controller can be configured to determine one of a positive condition and a flagged condition of the second vehicle component object by, storing the profile data, using the stored profile data to calculate a tolerance distance from a maximum height of the first vehicle component object to a maximum height of the second vehicle component object, determine the positive condition for the second vehicle component object if the tolerance distance lies within a set range, and determine a flagged condition for the second vehicle component object if the tolerance distance lies outside the set range.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
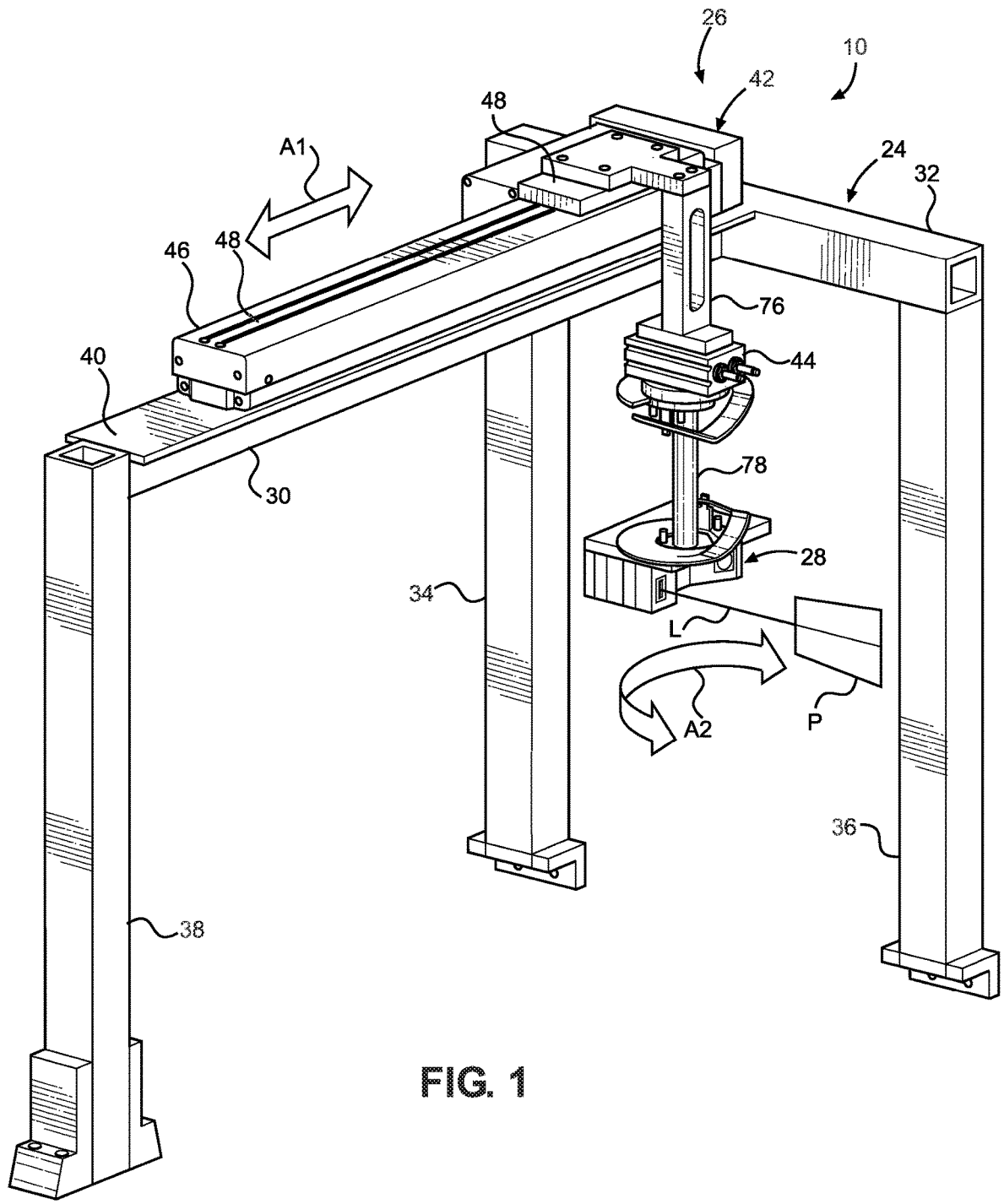
FIG. 1 is a perspective view of a profile inspection system made in accordance with principles of the disclosed subject matter.

FIG. 1 illustrates an embodiment of a profile inspection system 10 made in accordance with principles of the disclosed subject matter. The profile inspection system 10 can be advantageously implemented on an assembly line that produces an article of manufacture in which the profile inspection system 10 can provide a secondary verification that the article of manufactures has been assembled in accordance with a desired specification. The profile inspection system 10 can be configured to scan an article of manufacture and create a profile image based on the scan data, and then determine whether the article of manufacture conforms to the desired specification based on the scan data. The profile inspection system 10 can also be configured to communicate the results of the determination to an external assembly tracking system by wired or wireless communication. The external assembly monitoring system can be configured to collect and display information regarding the article of manufacture during the assembly process. The collected and displayed information can include the image profile and/or the results of the analysis of the profile image from the profile inspection system 10.

Figure 8:
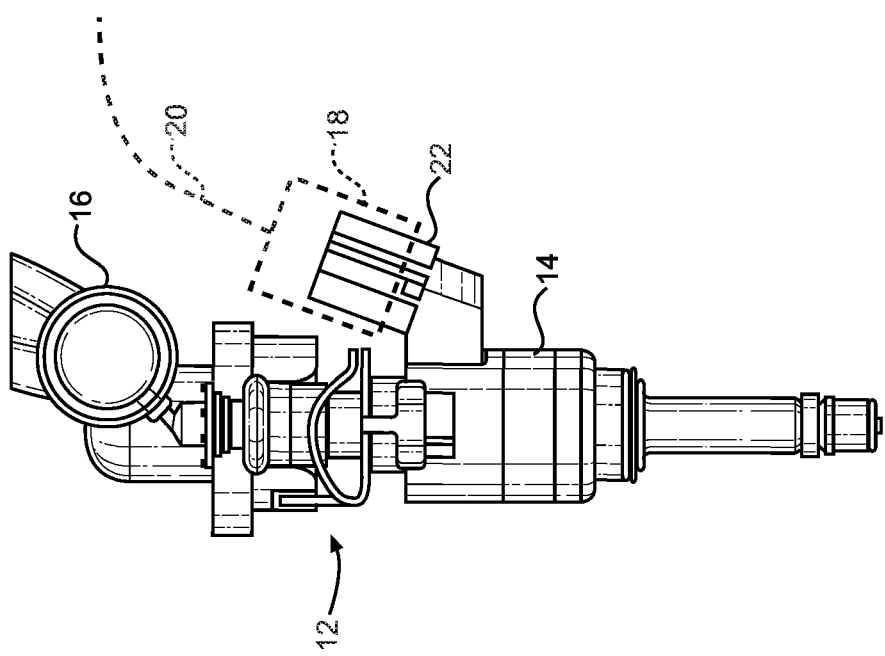
FIG. 8 is a side view of a fuel supply assembly that can be scanned by the profile inspection system of FIG. 1.

The article of manufacture can be a single component or structure or a combination of components or structures for a vehicle. The article of manufacture can be referred to as a workpiece or an assembly. FIG. 8 illustrates an exemplary article of manufacture that is configured as a fuel supply system 12. The fuel supply system 12 can include a fuel pipe 16 and at least one fuel injector 14 in fluid communication with the fuel pipe 16. The fuel pipe 16 also can be referred to as a fuel rail. The profile inspection system 10 can be configured to optically scan the fuel supply system 12 that is mounted onto a cylinder head of an internal combustion engine. As will be described in further detail below, the profile inspection system 10 can be configured to determine whether an electrical connector 18 of a wire harness 20 has been fully connected to a mating electrical connector 22 of the fuel injector 14. FIG. 8 schematically illustrates in phantom the electrical connector 18 and the wire harness 20.

Referring to FIG. 1, the profile inspection system 10 can include a support assembly 24, an actuator assembly 26 and an image processing apparatus 28. The actuator assembly 26 can move the image processing apparatus 28 relative to the article of manufacture while the article of manufacture is held stationary in order to create the profile image of the article of manufacture. The support assembly 24 can support the actuator assembly 26 and the image processing apparatus 28 relative to the article of manufacture as the actuator assembly 26 moves the image processing apparatus 28 relative to the article of manufacture.

The support assembly 24 can be configured to support the image processing apparatus 28 above a surface on which the article of manufacture is held. The support assembly 24 can include a main beam 30, cross beam 32 and a plurality of legs 34, 36, 38. The legs 34, 36, 38 can be fixed to a support surface and connected to the beams 30, 32 to support the beams 30, 32 above the support surface. The support surface can be the same as or different from the surface on which the article of manufacture is held stationary.

The cross beam 32 can be connected to the end of each of the first leg 34 and the second leg 36. The main beam 30 can be connected to the end of the third leg 38 and the cross beam 32. The beams 30, 32 can be connected to each other and the respective leg(s) 34, 36, 38 in any appropriate manner such as but not limited to threaded fastener(s), rivet(s), weld(s), adhesive, clamp(s), or any combination thereof.

The beams 30, 32 and the legs 34, 36, 38 can have any appropriate shape such as but not limited to a rectangular hollow tube, a circular hollow tube, an I-beam, an L-beam or a H-beam. The beams 30, 32 and the legs 34, 36, 38 can be made from any appropriate material such as but not limited to a metal, a metal alloy, a plastic or a composite material.

The support assembly 24 can include an actuator platform 40 mounted on the main beam 30. The actuator assembly 26 can be mounted on the actuator platform 40. The actuator platform can be configured to support electrical cable(s) connected to and extending from the actuator assembly 26. The actuator platform 40 can be connected to the main beam 30 and the actuator assembly 26 can be connected to the actuator platform 40 in any appropriate manner such as but not limited to threaded fastener(s), rivet(s), weld(s), adhesive, clamp(s), or any combination thereof.

The actuator assembly 26 can include a linear actuator 42 and a rotary actuator 44. The linear actuator 42 can move the image processing apparatus 28 in two directions along a linear path as indicated by the first double-headed arrow A1. The rotary actuator 44 can move the image processing apparatus 28 about an axis of rotation R (see FIG. 2) in a clockwise direction and in a counter-clockwise direction as indicated by the second double-headed arrow A2. The support assembly 24 can support the actuator assembly 26 and image processing apparatus 28 as the actuator assembly 26 moves the image processing apparatus 28 along (and with respect to) the article of manufacture.

Figure 4:
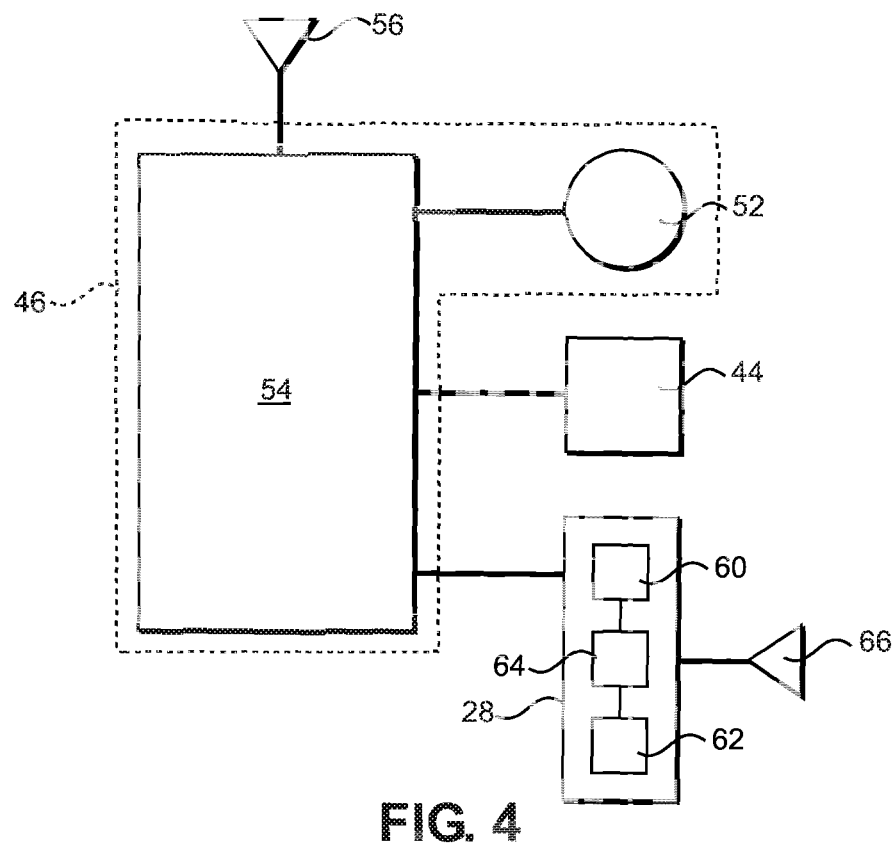
FIG. 4 is a diagram of a control system for the profile inspection system of FIG. 1.

Referring to FIGS. 1 and 4 collectively, the linear actuator 42 can include an actuator housing 46, a slider 48, cover 50 and a drive assembly 52. The drive assembly 52 can be mounted inside of the actuator housing 46 and can be any appropriate drive assembly such as but not limited to an electric motor and ball screw assembly, a fluid power piston and rod assembly, or a motor driven pinion and rack assembly. The slider 48 can be connected to the drive assembly 52 and displaced along the actuator housing 46 by the drive assembly 52. The actuator housing 46 can include a slot through which the slider 48 extends into the actuator housing 46. The cover 50 can be configured to selectively cover and uncover the slot as drive assembly 52 moves the slider 48 back and forth along the actuator housing 46.

Figure 2:
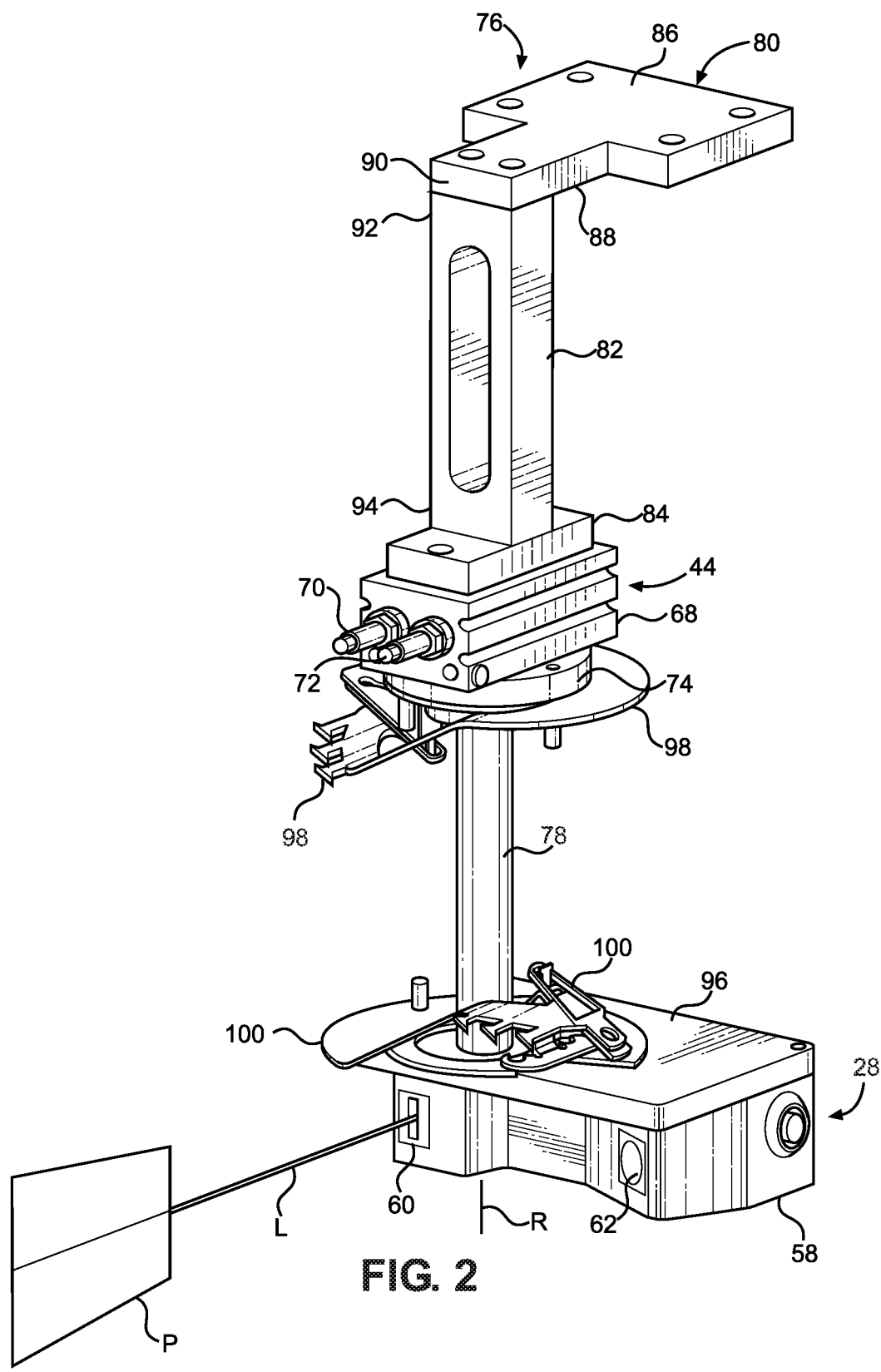
FIG. 2 is a perspective view of a scanning assembly of the profile inspection system of FIG. 1.

Referring to FIG. 2. the rotary actuator 44 can be any appropriate actuator, such as but not limited to a fluid power actuator, an electrical actuator, an electro-mechanical actuator, or a mechanical actuator, that can cause the image processing apparatus 28 to rotate about the axis of rotation R. For example, the rotary actuator 44 can be a pneumatic rotational cylinder that includes a double-acting piston driven by compressed air. The piston can be coupled to a motion conversion device such as a rack and gear assembly that converts the linear motion of the piston into rotary motion. The rotary actuator 44 can include a second actuator housing 68, a pair of ports 70, 72 that protrude from the second actuator housing 68 and an cable management adapter 74. The ports 70, 72 can be configured to be connected to a source of compressed air. The cable management adapter 74 can be supported by the second actuator housing 68 for rotation relative to the housing about the axis of rotation R. The motion conversion device can be connected to and drive the cable management adapter 74.

Referring to FIG. 4, the profile inspection system 10 can include an actuator controller 54 that is configured to cause the drive assembly 52 of the linear actuator to move the slider 48 and cause the rotary actuator 44 to rotate the image processing apparatus 28 according to a predetermined program that can be stored in an electronic memory storage device. The actuator controller 54 can be configured to cause the image processing apparatus 28 to initiate and terminate imaging of the article of manufacture. The actuator controller 54 can be a component of the linear actuator 42 and mounted within the actuator housing 46. In alternative embodiments, the actuator controller 54 can be spaced away from and external to the actuator housing 46.

The actuator controller 54 can be in electrical communication with the drive assembly 52, the rotary actuator 44 and the image processing apparatus 28. The actuator controller 54 can be in wired communication or wireless communication with any of the drive assembly 52, the rotary actuator 44 and the image processing apparatus 28 and the external assembly monitoring system. For example, the actuator controller 54 can include an actuator transceiver 56 that is configured to receive and emit electrical signals.

The linear actuator 42 can include any appropriate number of sensor(s) that detect a position of the slider 48 along the actuator housing 46. The sensor(s) can be in electrical communication with the actuator controller 54. The actuator controller 54 can be configured to process the data from the sensor(s) to determine the position of the slider 54 in accordance with a predetermined routine or program that the actuator executes during operation of the drive assembly 52. For example, the routine or program can include instructions for the actuator to stop and start movement of the slider 46 based on a predetermined set of parameters. Thus, the linear actuator 26 can be referred to as an intelligent actuator.

Figure 3:
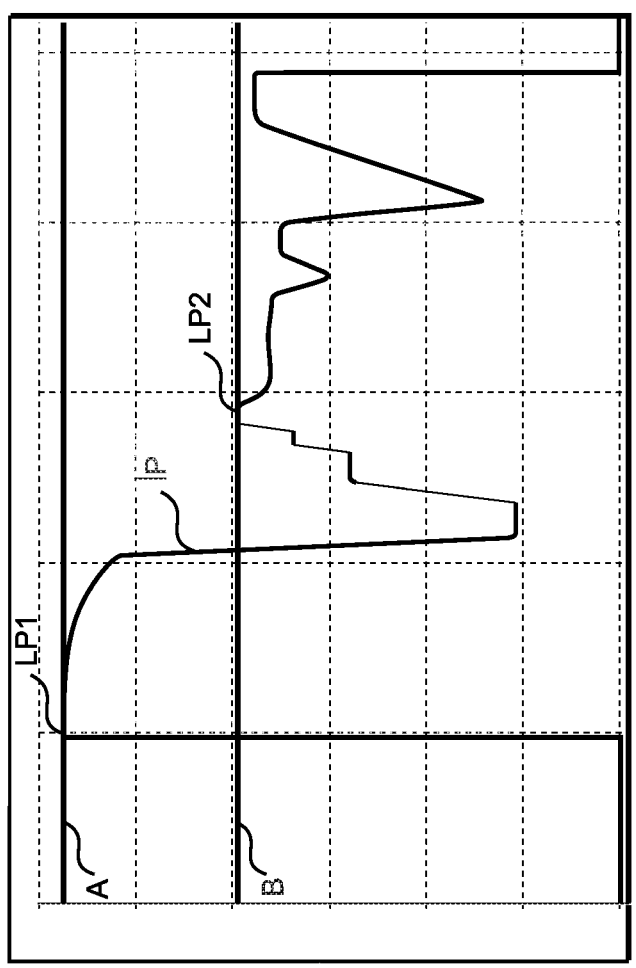
FIG. 3 is a graph depicting an exemplary profile created by the profile inspection system of FIG. 1.

Referring to FIGS. 2 and 3, the image processing apparatus 28 can include a scanner housing 58, a light source 60, an image capturing device 62, a scanner controller 64 and a scanner transceiver 66. The light source 60, the image capturing device 62 and the scanner controller 64 can be mounted in the scanner housing 58.

The light source 60 can be any appropriate light source such as but not limited to a linear laser light source that emits blue light, a high intensity discharge light source, a halogen lamp that emits white light, or an LED that emits white light, or a laser diode that emits blue light. Referring to FIGS. 1 and 2, the light source 60 can emit a light beam L that is movable within a scanning plane P that intersects the article of manufacture so that the scanning plane P encompasses a plurality of locations on the article of manufacture. The image processing apparatus 28 can be configured to move the light beam L as the actuator assembly 26 moves the image processing apparatus 28 back and forth in the directions of the first arrow A1 along the article of manufacture.

The light source 60 can be movably mounted within the scanner housing 58 in order to move the light beam L back and forth in the scanning plane P. In alternate embodiments, the image processing apparatus 28 can include one or more mirrors that are movably mounted in the scanner housing 58 such that the light beam L moves within the scanning plane P.

The image capturing device 62 can be any appropriate optical component, system or device that can collect and process light from the light beam L that is reflected by the article of manufacture to the image capturing device 62. The image capturing device 62 can be configured to convert the light incident on the image capturing device into an electrical signal or data. For example, the image capturing device can include a camera with or without one or more lenses. The camera can be any appropriate camera such as but not limited to a CCD camera or a CMOS camera that can process monochrome or multi-colored light.

The scanner controller 64 can be in electrical communication with the light source 60, the image capturing device 62 and the scanner transceiver 66. The scanner controller 64 can be configured to cause the light source to emit the light beam L and to terminate the light beam L based on a signal received from the actuator controller 54 and/or an external signal source such as but not limited to a proximity sensor that can detect the presence and absence of the article of manufacture within the scanning plane P. The scanner controller 64 can be configured to process the image signal/data collected by the image capturing device 62 and create image profile data of the article of manufacture from the image signal/data. The scanner controller 64 can also be configured to determine whether the article of manufacture conforms with the desired specification based on the image profile data, and to transmit a signal that includes the results of the scan of the article of manufacture to an external monitoring system via the scanner transceiver 66.

A desired specification for an article of manufacture can include one or more exterior dimension targets, or a location target of one or more portions of the article of manufacture, or a location target of one component of an article of manufacture relative to another component of the article of manufacture. The scanner controller 64 can be configured to determine whether the article of manufacture conforms with the desired specification by comparing the image profile data with corresponding data of the desired specification.

FIG. 3 illustrates an exemplary image profile IP that can be generated by the scanner controller 64. Based on the desired specification, a first local peak LP1 of the image profile IP can correspond to a first known portion of the article of manufacture and second local peak LP2 of the image profile IP can correspond to a second known portion of the article of manufacture. The upper line A can intersect the first local peak LP1 and the lower line B can intersect the second local peak LP2. The value of the difference between the local peaks LP1, LP2 can be indicative of the relative positions of first and second known portions of the article of manufacture. This difference can be used to determine whether the relative position of the two portions conforms to the desired specification.

For example, the scanner controller 64 can be configured to determine a difference of the values of the local peaks LP1, LP2 and compare this difference to a predetermined threshold. The predetermined threshold can be a single value or a range of values that correspond to an article of manufacture that conforms to a desired specification. If the difference between the local peaks LP1, LP2 equals or is within the predetermined threshold then it is determined that the article of manufacture likely conforms with the desired specification. If the difference between the local peaks LP1, LP2 is not equal to or is outside the predetermined threshold then it is determined that the article of manufacture likely does not conform with the desired specification.

The scanning controller 64 can be configured to transmit a signal to the external assembly monitoring system that is indicative of the results of the scan of the article of manufacture for future tracking of the article of manufacture and/or statistical analysis by the manufacturer. For example, the scanning controller 64 can transmit the results of the scan to an external monitoring system. The transmitted signal can include a part number that identifies the article of manufacture and the result of the scan. The external monitoring system can be configured to identify and flag each article of manufacture that likely does not conform to the desired specification for further attention by the manufacturer, if appropriate.

For example, the desired specification for each fuel supply system 12 can provide information regarding the desired position of the electrical connector 18 of the wire harness 20 relative to the fuel pipe 16. The first local peak LP1 of the image profile IP of FIG. 3 can correspond to a known portion of the fuel pipe 16. and the value of the second local peak LP2 can correspond to a known portion of the electrical connector 18 of the wire harness 20. The value of the first local peak LP1 of the fuel pipe 16 can be identical to or substantially the same within a known tolerance for each fuel assembly 12 for a given desired specification. However, the value of the second local peak LP2 of the electrical connector 18 can vary from one fuel injector 14 to another fuel injector 14 for the given specification if the connectors 18,22 are not mated in conformance with the desired specification. That is, the value of the first local peak LP1 can provide the image processing apparatus 28 with a predetermined reference value so that the image processing apparatus 28 can determine whether the electrical connectors 18, 22 conform with the desired specification.

Thus, the profile inspection system 10 can confirm whether or not an article of manufacture conforms to a desired specification. Further, the profile inspection system 10 can identify each article of manufacture that does conform with the specification and each article of manufacture that does not conform with the specification. Thus, the profile inspection system 10 can facilitate corrective measures, if appropriate, for each article of manufacture that does not conform to the desired specification.

Referring to FIGS. 1 and 2, the actuator assembly 26 can include a cantilevered arm 76 and a rotary shaft 78. The rotary actuator 44 can be connected to each of the cantilevered arm 76 and a rotary shaft 78 such that the rotary actuator 44 selectively rotates the rotary shaft 78 relative to the cantilever arm 76 about the axis of rotation R. The rotary shaft 78 can be centered on the axis of rotation R.

The cantilevered arm 76 can extend downward from the linear actuator 42 to the rotary actuator 44. The cantilevered arm 76 can be connected to the slider 48 so that the cantilevered arm 76, the rotary shaft 78 and the image processing apparatus 28 move together with the slider 48 in the two directions indicated by the first double-headed arrow A1. The cantilevered arm 76 can be connected to each of the slider 48 and the rotary actuator 44 in any appropriate manner such as threaded fastener(s), rivet(s), weld(s), adhesive, clamp(s) or any combination thereof.

Referring to FIG. 2, the cantilevered arm 76 can include a mounting plate 80, an extension 82 and a mounting flange 84.

The mounting plate 80 can include a main body 86 and a cantilevered projection 88. The main body 86 can be connected to the slider 48 in any appropriate manner such as but not limited to threaded fastener(s), rivet(s), weld(s), adhesive, clamp(s), or any combination thereof. The cantilevered projection 88 can extend away from the main body 86. The cantilevered projection 88 can be spaced away from the slider 48. The cantilevered projection 88 can terminate at a free end 90.

A first end 92 of the extension 82 can be connected to the free end 90 of the cantilevered projection 88 in any appropriate manner such as but not limited to threaded fastener(s), rivet(s), weld(s), adhesive, clamp(s), or any combination thereof. The mounting plate 80 and the extension 82 can form a generally L-shaped object. A second end 94 of the extension 82 can be connected to the mounting flange 84 in any appropriate manner such as but not limited to threaded fastener(s), rivet(s), weld(s), adhesive, clamp(s), or any combination thereof.

The mounting flange 84 and the extension 82 can form a generally T-shaped object. The mounting flange 84 can be generally rectangular in shape. However, alternate embodiments can include a first mounting flange 84 that has any appropriate or desired shape. The mounting flange 84 can be connected to the second actuator housing 68 in any appropriate manner such as but not limited to threaded fastener(s), rivet(s), weld(s), adhesive, clamp(s), or any combination thereof.

The actuator assembly 26 can include a second mounting flange 96 that is connected to each of the rotary shaft 78 and the scanner housing 58 in any appropriate manner such as but not limited to threaded fastener(s), rivet(s), weld(s), adhesive, clamp(s), or any combination thereof. The second mounting flange can be generally rectangular in shape. However, alternate embodiments can include a second mounting flange 96 that has any appropriate or desired shape. The rotary shaft 78 can extend from the cable management adapter 74 to the second mounting flange 96. The scanner housing 58 can be suspended below the second mounting flange 96.

The actuator assembly 26 can include one or more cable management systems that can protect and guide the electrical supply line(s), the electrical communication line(s) and the pneumatic pressure line(s) as the actuator assembly 26 moves the image processing apparatus 28 in the directions indicated by the first and second arrows A1, A2. FIG. 2 shows the first and second cable management mounts 98, 100 for a rotational cable management system that can extend between the rotary actuator 44 and the image processing apparatus 28.

Figure 6:
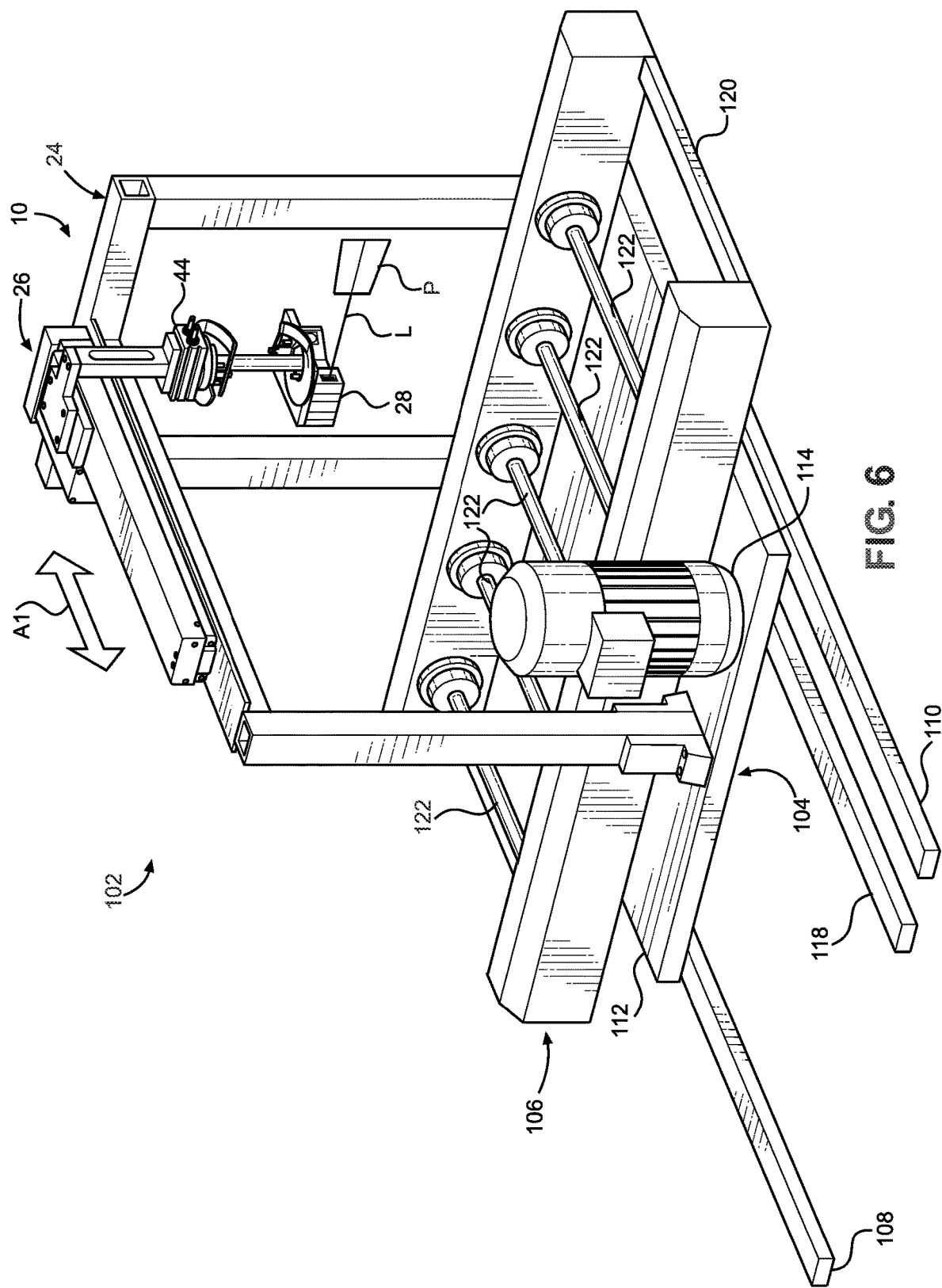
FIG. 6 is a perspective view of a manufacturing cell including the profile inspection system of FIG. 1.
Figure 7:
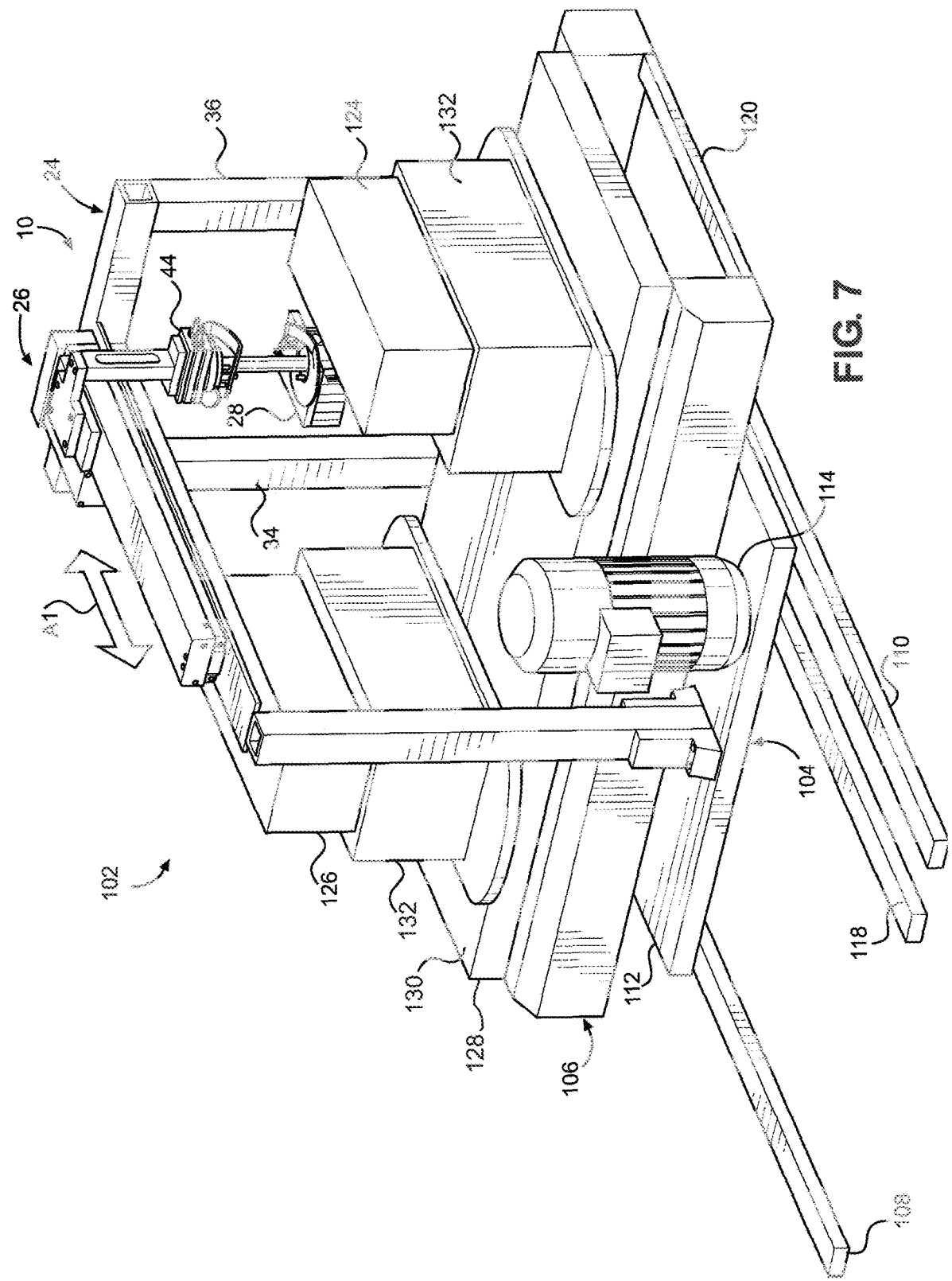
FIG. 7 is a perspective view of the manufacturing cell of FIG. 6 supporting a pallet carrying schematically illustrated articles of manufacture.

FIGS. 6 and 7 show a manufacturing cell 102 that can include the profile inspection system 10. The manufacturing cell 102 can be configured to support the article of manufacture in a fixed position on the manufacturing cell 102 while the image processing apparatus 28 scans the article of manufacture. FIG. 7 schematically illustrates a pair of articles of manufacture 124, 126. The manufacturing cell 102 can be configured to convey the article of manufactures 124, 126 to and from the fixed position.

The manufacturing cell 102 can include a cell conveyor 104 and an article conveyor 106. The profile inspection system 10 and the article conveyor 106 can be mounted on the cell conveyor 104 at fixed positions on the cell conveyor 104.

The cell conveyor 104 can be configured to move between a first position and a second position on a pair of guide rails 108, 110. The cell conveyor 104 can include a platform 112 and a motor 114. The profile inspection system 10 and the article conveyor 106 can be connected to the platform 112 in any appropriate manner such as but not limited to threaded fastener(s), rivet(s), weld(s), adhesive, clamp(s), or any combination thereof. The motor 114 can connected to the platform in any appropriate manner such as but not limited to threaded fastener(s), rivet(s), weld(s), adhesive, clamp(s), or any combination thereof. The motor 114 can drive a gear that engages a toothed rack 118 such that the motor 114 can cause the manufacturing cell 102 to move back and forth between the first position and the second position. FIG. 7 shows the cell conveyor 104 in the first position. When in the second position, the cell conveyor 104 would be on the exposed portion of the guide rails 108, 110 shown in FIG. 7. FIGS. 6 and 7 schematically illustrate the toothed rack 118.

The article conveyor 106 can include a base 120 and a plurality of rollers 122. The rollers 122 can be rotatably supported by the base 120 in any appropriate manner.

Referring to FIG. 7, the articles of manufacture 124, 126 can be supported on and held in a fixed position on the article conveyor 106. for example, the articles of manufacture 124, 126 can be mounted on and fixed to a pallet 128. The pallet 128 can be configured to move along the rollers 122 so that the pallet 128 can be moved onto and off of the article conveyor 106.

The article conveyor 106 can be configured with a drive mechanism and a lock mechanism that are omitted from FIGS. 6 and 7 for simplicity and clarity of the drawings. The drive mechanism can engage the pallet 128 such that the drive mechanism moves the pallet 128 onto and off of the article conveyor 106. The lock mechanism can be configured to engage the pallet 128 such that the pallet 128 is fixed in a predetermined position relative to the support assembly 24 of the profile inspection system 10 while the image processing apparatus 28 scans both articles of manufacture 124, 126.

The articles of manufacture 124, 126 can be fixed directly to an upper surface 130 of the pallet 128. Alternatively, the pallet 128 can include a pair of risers 132 on which the articles of manufacture 124, 126 can be mounted and fixed. The risers 132 can be configured to facilitate access to the articles of manufacture 124, 126 by the image process apparatus 28 and/or a worker and/or other tools, systems or apparatus that act on the articles of manufacture 124, 126.

The actuator assembly 26 can be configured to position the image processing apparatus 28 in a first predetermined position adjacent to the first and second legs 34, 36 of the support assembly 24 before or after the pallet 128 moves onto the article conveyor 106. The actuator assembly 26 can be configured to rotate the image processing apparatus so that the light source 60 and the image capturing device 62 face the first article of manufacture 124 before or after the pallet 128 moves onto the article conveyor 106. The actuator assembly 26 can be configured to move the image processing apparatus 28 in one of the directions indicated by the first double head arrow A1 toward the third leg 38 of the support assembly 24 while the articles of manufacture 124, 126 are fixed in a stationary position with respect to the support assembly 24 and the article conveyor 106 so that the image processing apparatus 28 can scan the first article of manufacture 124.

After the actuator assembly 26 has moved the image processing apparatus 28 to a second predetermined position adjacent to the third leg 38 of the support assembly 24, the actuator assembly 26 can be configured to rotate the image processing apparatus 28 about the axis of rotation R in either of the directions indicated by the second double-headed arrow A2 so that the light source 60 and the image capturing device 62 face the second article of manufacture 126. Then, the actuator assembly 26 can be configured to move the image processing apparatus 28 in the other of the directions indicated by the first double head arrow A1 toward the first and second legs 34, 38 of the support assembly 24 while the articles of manufacture 124, 126 are fixed in a stationary position with respect to the support assembly 24 and the article conveyor 106 so that the image processing apparatus 28 can scan the second article of manufacture 126.

The actuator assembly 26 can be configured to move the image processing apparatus 28 during movement of the cell conveyor 104 from the first position to the second position. The image processing apparatus 28 can be configured to scan the articles of manufacture 124, 126 during the movement of the cell conveyor 104 from the first position to the second position.

In an exemplary processing of the articles of manufacture 124, 126 by the manufacturing cell 102, the cell conveyor 104 can be positioned in the first position shown in FIGS. 6 and 7 by the motor 114. Then, the pallet 128 carrying the articles of manufacturing 124, 126 can be moved from a different manufacturing cell or station onto the article conveyor 106 of the manufacturing cell 102. After the pallet 128 is locked in place on the article conveyor 106, the motor 114 can move the cell conveyor 104 along the guide rails 108, 110 from the first position to the second position. Also, after the pallet 128 is locked in place on the cell conveyor 104, the light source 60 and the image capturing device 62 of the image processing apparatus 28 can be activated and the actuator assembly 26 can move the image processing apparatus 28 so that the image processing apparatus scans the first article of manufacture 124. The actuator controller 54 can cause the image actuator assembly 26 to move the processing apparatus 28 when the cell conveyor 104 is stationary and/or moving. When the actuator controller 54 determines that the actuator assembly 26 has moved the image processing apparatus 28 to the second predetermined position, the actuator controller 54 can cause the rotary actuator 44 to rotate the image processing apparatus 28 about the axis of rotation R so that the light source 60 and the image capturing device 62 face the second article of manufacture 126. Then, the actuator assembly 26 can move the image processing apparatus 28 along the second article of manufacture 126 and the image processing apparatus 28 can scan the second article of manufacture 126. When the actuator controller 54 determines that the actuator assembly 26 has moved the image processing apparatus 28 to the first predetermined position, the actuator controller 54 can cause the rotary actuator 44 to rotate the image processing apparatus 28 about the axis of rotation R so that the light source 60 and the image capturing device 62 face the first article of manufacture 126. Then, the pallet 128 can be unlocked and moved off of the article conveyor 106. After the pallet 128 exits the manufacturing cell 102, the cell conveyor 104 can return the manufacturing cell 102 to the first position to wait loading of another pallet 128.

In an exemplary embodiment, each of the articles of manufacture 124, 126 can be a cylinder head assembly for an internal combustion engine. The cylinder head assembly can include a cylinder head and the fuel supply system 12 and wire harness 20 of FIG. 8 mounted on the cylinder head. The cylinder head assemblies can be oriented on the pallet 128 such that the fuel supply system 12 face each other and are spaced away from each other, and the image processing apparatus 28 can move into the space between the two fuel supply systems 12 during the scanning process. Thus, the image processing apparatus 28 can scan the fuel pipe 14 and electrical connectors 18 of each cylinder head assembly and can create an image profile that includes an image profile of the fuel pipe 14 and an image profile of the electrical connectors 18.

Figure 5:
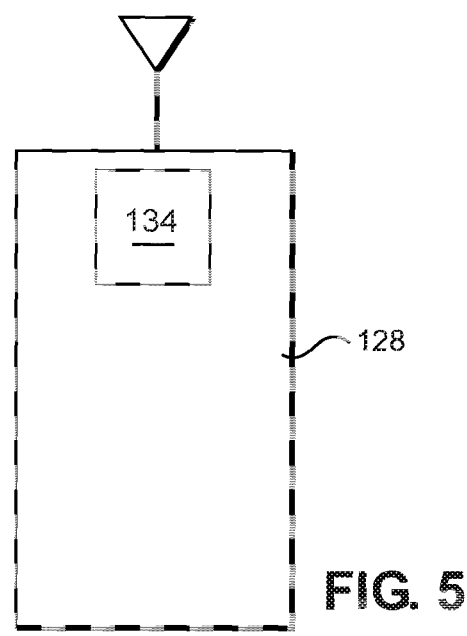
FIG. 5 is a diagram of a communication system on a workpiece transport that can interact and communicate with the profile inspection system of FIG. 1.

Referring to FIG. 5, the pallet 128 can include an RFID tag 134. The RFID tag 134 can be in wireless communication with the actuator controller 54 and/or the scanner controller 64. The RFID tag 134 can be configured to receive the image profile from the scanner controller 64 and the results of the analysis performed by the scanner controller 64 based on the image profile. The RFID tag 134 can also be configured to transmit to the external monitoring system the image profile and the results of the analysis based on the image profile.

Electrical communication lines (not numbered) can connect the controllers 54, 64 to each other and to the drive assembly 52, the light source 60, the image capturing device 62, the motor 114 and any sensor(s) used by the profile inspection system 10 and the manufacturing cell 102 in any appropriate manner. Electrical communication can be either one-way communication or two-way communication and can be networked or not networked. The controllers 54, 64 also can be referred to as an electronic control unit (ECU) or as a central processing unit. The controllers 54, 64 can include or can be in electrical communication with an electronic storage medium such as but not limited to ROM, RAM, EEPROM, etc.

While certain embodiments of the invention are described above, it should be understood that the invention can be embodied and configured in many different ways without departing from the spirit and scope of the invention.

Although the exemplary image processing apparatus 28 described above can include a blue laser light source 60, the image processing apparatus 28 can be any appropriate optical scanning device that can render a profile image of an article of manufacture.

Although the image processing apparatus 28 can be suspended from the support assembly 24, exemplary embodiments can include any appropriate orientation of the image processing apparatus 28 relative to the support assembly 24 that can provide a desired profile image of the article of manufacture. For example, the support structure 24 can be configured to support the image processing apparatus 28 and the article of manufacture can be positioned above the image processing apparatus 28 so that the image processing apparatus 28 can scan a bottom portion of the article of manufacture.

The actuator assembly 26 can be provided with two degrees of freedom as indicated by the first and second double-headed arrows A1, A2. However, exemplary embodiments can include an actuator assembly 26 that can provide one or more additional degrees of freedom in order to obtain the desired image profile(s) of the article of manufacture. For example, the actuator assembly 26 can be configured to move the image processing apparatus 28 in a direction that is orthogonal to the directions indicated by first double headed arrow A1 and/or rotate the image processing apparatus 28 about an axis that is orthogonal to the axis of the rotational directions indicated by the second double-headed arrow A2.

Instead of the actuator controller 54, the scanner controller 64 can be configured to cause the rotary actuator 44 to rotate the image processing apparatus 28. The scanner controller 64 can signal the rotary actuator 44 based on a signal from the actuator controller 54 and/or from an external source such as but not limited to a proximity sensor that can detect the relative position of the image processing apparatus 28 to the proximity sensor.

Alternate embodiments can replace both of the actuator controller 54 and the scanner controller 64 with a single controller that can be configured to perform the tasks of each of the controllers 54, 64 described above. Further, this single controller can be configured to perform the tasks of the external monitoring system described above. In this alternate embodiment, the single controller can be mounted on any appropriate portion of the profile inspection system 10, or on any appropriate portion of the manufacturing cell 102.

Alternate embodiments can replace the actuator controller 54 with manual controls that can permit a human operator to cause the linear actuator 42 and/or the rotary actuator 44 to move in the directions of the double-headed arrows A1, A2. The manual controls can be mounted on any appropriate location of the profile inspection station 10, or the manual controls can be mounted at a location that is spaced away from the profile inspection station 10.

Alternate embodiments of the manufacturing cell 102 can be fixed in a single position such that the cell conveyor 104, the guide rails 108, 110, the motor 114 and the toothed rack 118 can be omitted Alternate embodiments of the profile inspection station 10 can substitute the cantilevered arm 76 with any appropriate structure that can connect the image processing apparatus 28 to the actuator assembly 26 such that the image processing apparatus 28 can move in the directions indicated by the double-headed arrows A1, A2.

What is claimed is:

1. A manufacturing cell for manufacturing a vehicle component, comprising:
    an actuator;
    a pneumatic rotational cylinder;
    an arm extending downward from the actuator to the pneumatic rotational cylinder;
    a laser scanner attached to the pneumatic rotational cylinder for movement with the pneumatic rotational cylinder, the laser scanner configured to,
      scan at least a first object and a second object, and
      create profile data indicative of a 3D profile of the first object and the second object; and
    a controller in electrical communication with the laser scanner and configured to assure that the second object is in a positive condition by,
      storing the profile data,
      using the stored profile data to calculate a tolerance distance from a maximum height of the first object to a maximum height of the second object,
      determine the positive condition for the second object if the tolerance distance lies within a set range, and
      determine a flagged condition for the second object if the tolerance distance lies outside the set range.

2. The manufacturing cell according to claim 1, wherein the actuator is configured to move the laser scanner relative to the first and second objects along a first path.

3. The manufacturing cell according to claim 1, wherein
    a first assembly includes the first object and the second object,
    a second assembly includes another first object and another second object, and
    the actuator is configured to move the laser scanner relative to the first assembly in a first direction and subsequently move the laser scanner relative to a second assembly in a second direction that is opposite to the first direction.

4. The manufacturing cell according to claim 3, wherein
    the actuator is configured to move the laser scanner relative to the first assembly in the first direction from a first position relative to the first assembly to a second position relative to the first assembly, and move the laser scanner relative to the second assembly in the second direction from the second position to the first position, where the second direction is opposite to the first direction, and
    the controller is configured to cause the pneumatic rotational cylinder to rotate the scanner away from the first assembly and to face the second assembly when the laser scanner is in the second position and before the actuator moves the laser scanner in the second direction.

5. The manufacturing cell according to claim 4, wherein the controller is configured to cause the pneumatic rotational cylinder to rotate the scanner away from the second assembly and to face the first assembly when the laser scanner is in the first position and after the actuator moves the laser scanner in the second direction from the second position to the first position.

6. The manufacturing cell according to claim 1, further comprising:
a support structure, wherein the actuator is fixed to the support structure and moves the laser scanner relative to the support structure, and the first and second objects are held in a fixed position relative to the support structure.

7. The manufacturing cell according to claim 6, wherein the support structure includes a plurality of legs and a main beam connected to and supported by the legs,
the actuator is mounted on the main beam,
the arm includes a first portion that is cantilevered to the actuator and a second portion that extends downward from the first portion, and
the laser scanner is suspended below the main beam.

8. The manufacturing cell according to claim 1, further comprising:
a rail assembly; and
a conveyor configured to move along the rail assembly between a first conveyor position and a second conveyor position, the conveyor is configured to movably support a pallet on which the first object and the second object are fixed such that the pallet is movable onto and off of the conveyor, and the conveyor is configured to hold the pallet stationary relative to the conveyor when the conveyor moves from the first conveyor position to the second conveyor position, and
the actuator is configured to move the laser scanner when the conveyor moves from the first conveyor position to the second conveyor position and the pallet is held stationary relative to the conveyor.

9. The manufacturing cell according to claim 8, wherein the pallet includes an RFID tag in electrical communication with the controller.

10. The manufacturing cell according to claim 8, further comprising:
a support structure mounted at a fixed position on the conveyor and including,
a plurality of legs connected to and extending away from the conveyor, and
a main beam connected to and supported by the legs above the conveyor, wherein
the actuator is mounted on the main beam and is configured to move the laser scanner relative to the main beam and the conveyor, and
the laser scanner is suspended below the main beam and above the conveyor.

11. The manufacturing cell according to claim 1, wherein the controller is configured to store data that includes at least one index that is unique to the second object and one of the positive condition and the flagged condition determined by the controller.

12. The manufacturing cell according to claim 1, wherein the first object is a fuel pipe of an internal combustion engine, and the fuel pipe is in fluid communication with a fuel injector, and the second object is an electrical connector configured to be in electrical communication with a mating connector on the fuel injector.

13. The manufacturing cell according to claim 1, further comprising:
a support structure, wherein
the actuator is fixed to the support structure and moves the laser scanner relative to the support structure, and the first and second objects are held in a fixed position relative to the support structure, and
the actuator is configured to move the laser scanner relative to the first and second objects along a first path.

14. The manufacturing cell according to claim 1, further comprising:
a support structure, wherein
the actuator is fixed to the support structure and moves the laser scanner relative to the support structure, and the first and second objects are held in a fixed position relative to the support structure,
a first assembly includes the first object and the second object,
a second assembly includes another first object and another second object, and
the actuator is configured to move the laser scanner relative to the first assembly in a first direction and subsequently move the laser scanner relative to a second assembly in a second direction that is opposite to the first direction.

15. The manufacturing cell according to claim 1, further comprising:
a rail assembly;
a conveyor configured to move along the rail assembly between a first conveyor position and a second conveyor position, the conveyor is configured to movably support a pallet on which the first object and the second object are fixed such that the pallet is movable onto and off of the conveyor, and the conveyor is configured to hold the pallet stationary relative to the conveyor when the conveyor moves from the first conveyor position to the second conveyor position; and
a support structure mounted on the conveyor, wherein
the actuator is fixed to the support structure and moves the laser scanner relative to the support structure, and the first and second objects are held in a fixed position relative to the support structure, and
the actuator is configured to move the laser scanner when the conveyor moves from the first conveyor position to the second conveyor position and the pallet is held stationary relative to the conveyor.

16. A profile inspection system for verifying a relative position between a first vehicle component object and a second vehicle component object, the profile inspection station comprising:
a linear actuator;
a support arm connected to the linear actuator;
a rotary actuator connected to the support arm;
a laser scanner connected to the rotary actuator and configured to,
scan at least the first vehicle component object and the second vehicle component object, and
create profile data of the first vehicle component object and the second vehicle component object based on the scan; and
a controller in electrical communication with the laser scanner and configured to determine one of a positive condition and a flagged condition of the second vehicle component object by, storing the profile data, using the stored profile data to calculate a tolerance distance from a maximum height of the first vehicle component object to a maximum height of the second vehicle component object, determine the positive condition for the second vehicle component object if the tolerance distance lies within a set range, and determine a flagged condition for the second vehicle component object if the tolerance distance lies outside the set range.

17. The profile inspection system of claim 16, wherein the first vehicle component object is a fuel pipe of an internal combustion engine, and the fuel pipe is in fluid communication with a fuel injector, and the second vehicle component object is an electrical connector configured to be in electrical communication with a mating connector on the fuel injector.

18. The profile inspection system of claim 17, wherein the flagged condition is indicative of the electrical connector not being fully connected to the mating connector on the fuel injector.

19. The profile inspection system of claim 16, wherein the first vehicle component object is a fuel rail and the second vehicle component object is a plurality of electrical connectors configured to be in electrical communication with a respective mating connector on a fuel injector.

20. A profile inspection system for verifying a relative position between a first vehicle component object and a second vehicle component object, the profile inspection station comprising:

a linear actuator;

a support arm connected to the linear actuator;

a rotary actuator connected to the support arm;

a laser scanner connected to the rotary actuator and configured to, scan at least the first vehicle component object and the second vehicle component object, and create profile data of the first vehicle component object and the second vehicle component object based on the scan; and a controller in electrical communication with the laser scanner and configured to determine one of a positive condition and a flagged condition of the second vehicle component object by, storing the profile data, using the stored profile data to calculate a tolerance distance from a maximum height of the first vehicle component object to a maximum height of the second vehicle component object, determine the positive condition for the second vehicle component object if the tolerance distance lies within a set range, determine a flagged condition for the second vehicle component object if the tolerance distance lies outside the set range, and store data that includes at least one index that is unique to the second object and one of the positive condition and the flagged condition determined by the controller; and a support structure, wherein the linear actuator is fixed to the support structure and moves the laser scanner relative to the support structure, and the first vehicle component object and the second vehicle component object are held in a fixed position relative to the support structure.

\* \* \* \* \*